June 5, 1923.
O. H. CASTLE
1,457,427
CONDENSING PUMP
Filed Aug. 31, 1921
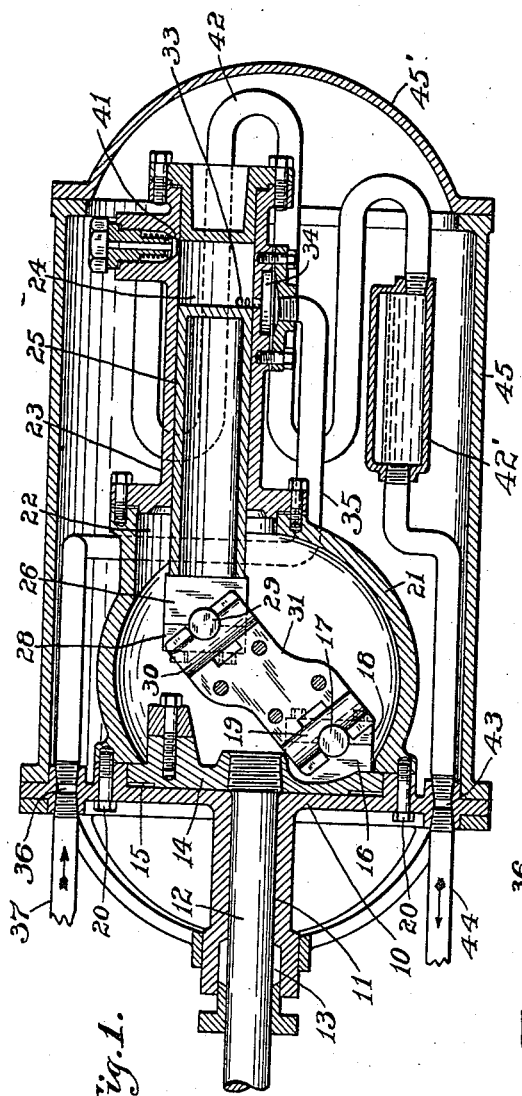
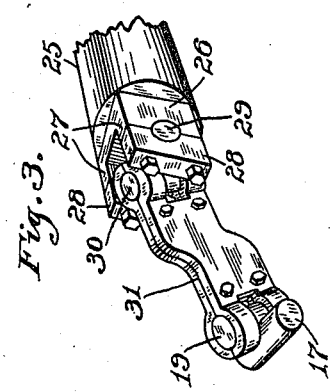
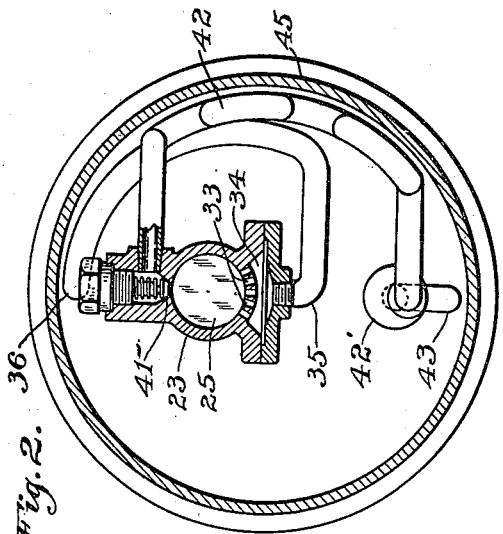
Inventor
Oliver H. Castle,
By
Hood & Schley.
Attorney Patented June 5, 1923.

1,457,427

UNITED STATES PATENT OFFICE.

OLIVER H. CASTLE, OF INDIANAPOLIS, INDIANA.

CONDENSING PUMP.

Application filed August 31, 1921. Serial No. 497,199.

*To all whom it may concern:*

Be it known that I, OLIVER H. CASTLE, a citizen of the United States, residing at Indianapolis, in the county of Marion and State of Indiana, have invented a new and useful Condensing Pump, of which the following is a specification.

The object of my invention is to produce a cheap but highly efficient condensing pump for handling the ammonia used in artificial refrigerating plants, the construction being such as to practically eliminate the possibility of leakage.

The accompanying drawings illustrate my invention. Fig. 1 is an axial section; Fig. 2, a transverse section, and Fig. 3 a fragmentary detail of a special form of knuckle joint which permits an unusually close connection between the rotary driver and the reciprocating plunger of the pump.

In the drawings, 10 indicates a disk head provided with an internal bearing 11 in which is journaled the main drive shaft 12, the bearing 11 being provided with an external packing gland 13. Shaft 12, at its inner end carries a disk 14 which is seated in a circular pocket 15 formed in the inner face of head 10. Disk 14 carries an eccentrically placed pair of bearing blocks 16 which form seats for a trunnion pin 17, the blocks 16 being each supplemented by a removable cap 18. Pin 17 carries, or is formed integral with, a trunnion pin 19, the axis of which is at right angles to the axis of pin 17 and is laterally offset therefrom so that the axes of the two pins 17 and 19 do not intersect, as clearly shown in Figs. 1 and 3.

Secured to head 10 by bolts 20, is a hollow globular casing 21, which overlaps disk 14 and holds the same in the pocket 15. The outer end of casing 21 is provided with an eccentrically arranged opening 22, which is covered by the cylinder body 23, having a pump cylinder 24, the axis of which is parallel with, but eccentric to, the axis of shaft 12. Mounted in cylinder 24 is a piston 25, the outer end of which carries a head block 26 comprising a pair of bearing ears 27, 27, which are supplemented by removable caps 28, 28, to form journals for a trunnion pin 29 which carries, or is formed integral with, a trunnion pin 30, the axis of which is substantially at right angles to the axis of pin 29 and is laterally off-set therefrom.

The two trunnion structures 17—19 and 29—30 are connected by a two part link 31 which is provided at its opposite ends with bearings for the reception of the trunnion pins 19 and 30 respectively, the construction being such that a line connecting the axes of pins 17 and 29 is at an acute angle to a line drawn either through the axis of the pin 17 or the axis of pin 29 and at right angles to the axis of the companion pin 19 or 30. I have found that by this arrangement the link 31 may be very short and the axis of piston 25 may be considerably eccentric to the axis of shaft 12 so that the length of stroke of the piston may be considerable without unduly increasing the length of the structure as a whole.

Leading into cylinder 24, at the end of the outward stroke of piston 25, are inlet ports 33 which receive supply of gas from the pipe 35 which is led through head 10 at 36 so as to connect pipe 37 which is connected with the exhaust side of the refrigerating coil (not shown). Leading from cylinder 24 is a discharge valve 41, of ordinary type, which delivers to the condensing coil 42, in which is embodied a reservoir 42' which delivers through head 10 at 43 and is connected with the pipe 44 which leads to the supply side of the refrigerating coil.

The entire structure which has thus far been described is conveniently enclosed by a cylindrical casing 45 which is attached to head 10 and consists in part of a removable end 45' thus forming a chamber which may be filled with water so as to facilitate condensation.

Rotation of shaft 12 causes simultaneous rotation and axial reciprocation of piston 25 in cylinder 24, thereby causing high compression of ammonia in cylinder 24 and delivery thereof through the condensing coil 42.

I claim as my invention:

1. The combination with a cylinder and piston mounted therein, of a driving shaft eccentric to the piston and a driving connection between the piston and shaft, comprising an eccentric bearing block carried by the driving shaft, a bearing block carried by the piston, a pair of trunnion members, each comprising a pair of trunnion pins lying at right angles to each other, one pin of each trunnion member journaled in a bearing block, and a connecting link connecting the other pins of the trunnion members.

2. The combination with a cylinder and piston mounted therein, of a driving shaft eccentric to the piston and a driving connection between the piston and shaft, comprising an eccentric bearing block carried by the driving shaft, a bearing block carried by the piston, a pair of trunnion members, each comprising a pair of trunnion pins lying at right angles to each other and laterally off-set, one pin of each trunnion member journaled in a bearing block, and a connecting link connecting the other pins of the trunnion members.

3. A condensing pump comprising a main head, a drive shaft journaled in said head and provided with a disk, a bearing block carried eccentrically by said disk, a cylinder carried by the head with its axis eccentric to the axis of the shaft, a piston arranged in said cylinder, a knuckle joint connection between the eccentric bearing block and the piston, supply and discharge connections leading to and from supply and discharge ports of the cylinder, and a casing secured to the head and enclosing the other parts.

4. A condensing pump comprising a main head, a drive shaft journaled in said head and provided with a disk, a bearing block carried eccentrically by said disk, a cylinder carried by the head with its axis eccentric to the axis of the shaft, a piston arranged in said cylinder, and a knuckle joint connection between the eccentric bearing block and the piston.

5. The combination of a cylinder and piston, said cylinder having inlet and exhaust ports, a supporting plate supporting the cylinder and having inlet and outlet openings, means extending through the supporting plate for operating such piston, an inlet pipe connecting said inlet port and said inlet opening, a discharge pipe connecting said discharge port and said outlet opening, said discharge pipe having a serpentine foundation to increase its length, and a removable outer shell mounted on said supporting plate and enclosing said cylinder and said two pipes to form a water jacket therefor.

6. The combination of a cylinder and piston, said cylinder having inlet and exhaust ports, a supporting plate supporting the cylinder and having inlet and outlet openings, means extending through the supporting plate for operating such piston, an inlet pipe connecting said inlet port and said inlet opening, a discharge pipe connecting said discharge port and said outlet opening, and a removable outer shell mounted on said supporting plate and enclosing said cylinder and said two pipes to form a water jacket therefor.

7. The combination of a cylinder and piston, said cylinder having inlet and exhaust ports, a supporting plate supporting the cylinder and having inlet and outlet openings, means extending through the supporting plate for operating such piston, an inlet pipe connecting said inlet port and said inlet opening, a discharge pipe connecting said discharge port and said outlet opening, and a removable outer shell mounted on said supporting plate and enclosing said cylinder and said two pipes to form a water jacket therefor, said discharge pipe including an enlargement constituting a liquid-containing chamber.

In witness whereof, I OLIVER H. CASTLE have hereunto set my hand at Indianapolis, Indiana.

OLIVER H. CASTLE.